United States Patent
Conners (10) Patent No.: US 10,640,084 B1
(45) Date of Patent: May 5, 2020

(54) EARLY WARNING THEFT ALERT AND VEHICLE TRACKING SYSTEM

(71) Applicant: Global Promotions, Inc., Spring Hill, FL (US)

(72) Inventor: Michael T Conners, Spring Hill, FL (US)

(73) Assignee: GLOBAL PROMOTIONS, INC., Spring Hill, FL (US)

( * ) Notice: Subject to any disclaimer, the term of this patent is extended or adjusted under 35 U.S.C. 154(b) by 0 days.

(21) Appl. No.: 16/695,658

(22) Filed: Nov. 26, 2019

(51) Int. Cl.
| | |
|---|---|
| *B60R 25/102* | (2013.01) |
| *B60R 25/33* | (2013.01) |
| *B60R 25/32* | (2013.01) |
| *H04W 4/40* | (2018.01) |
| *B60R 25/10* | (2013.01) |

(52) U.S. Cl.
CPC .......... *B60R 25/102* (2013.01); *B60R 25/32* (2013.01); *B60R 25/33* (2013.01); *H04W 4/40* (2018.02); *B60R 2025/1016* (2013.01); *B60R 2325/101* (2013.01); *B60R 2325/205* (2013.01); *B60R 2325/306* (2013.01)

(58) Field of Classification Search
CPC ......... B60R 25/00; B60R 25/04; B60R 25/24; B60R 25/06; B60R 25/102; B60R 25/32; B60R 25/33; G07C 9/27; G07C 9/0039; G07C 9/00896; G07C 5/008
See application file for complete search history.

(56) References Cited

U.S. PATENT DOCUMENTS

| | | | | |
|---|---|---|---|---|
| 7,474,208 B1* | 1/2009 | Klein | .................... | G08B 21/24 340/384.4 |
| 7,834,745 B2* | 11/2010 | Ramirez | ................. | B60R 25/00 340/425.5 |
| 7,973,649 B2* | 7/2011 | DeMille | .................. | B60R 25/10 307/10.2 |
| 8,325,026 B2* | 12/2012 | Ramirez | ................. | B60R 25/00 340/425.5 |
| 8,477,020 B2* | 7/2013 | Ramirez | ................. | B60R 25/00 340/426.19 |
| 8,816,845 B2 | 8/2014 | Hoover et al. | | |
| 9,845,050 B1 | 12/2017 | Garza et al. | | |
| 9,878,691 B2 | 1/2018 | Morris | | |
| 9,988,014 B2 | 6/2018 | Parasurama et al. | | |
| 10,195,988 B1 | 2/2019 | Garza et al. | | |
| 10,249,123 B2 | 4/2019 | Hatton | | |
| 10,358,115 B2* | 7/2019 | Jeong | ..................... | B60R 25/24 |
| 2004/0046452 A1* | 3/2004 | Suyama | ................. | B60R 25/00 307/10.2 |
| 2004/0075541 A1* | 4/2004 | Simoneau | ............... | B60R 25/06 340/426.11 |
| 2004/0090308 A1* | 5/2004 | Takahashi | ............... | B60R 25/24 340/5.72 |
| 2004/0160314 A1* | 8/2004 | Utter | ..................... | B60R 25/042 340/426.1 |

(Continued)

*Primary Examiner* — Hoi C Lau
(74) *Attorney, Agent, or Firm* — Larson & Larson, P.A.; Justin P. Miller; Frank Liebenow (57) ABSTRACT

The device and system discussed below are designed to track and report vehicle theft. The device and system are focused on use on smaller vehicles, specifically motorcycles, small watercraft, another related power sports hardware. The theft detection system tracks movement in combination with determining whether an authorized user is present.

6 Claims, 8 Drawing Sheets

(56) References Cited

U.S. PATENT DOCUMENTS

| | | | |
|---|---|---|---|
| 2005/0151618 A1* | 7/2005 | Inagaki | H04B 1/3805 340/5.23 |
| 2005/0179518 A1* | 8/2005 | Kawamura | G07C 9/27 340/5.23 |
| 2005/0179519 A1* | 8/2005 | Kawamura | B60R 25/24 340/5.23 |
| 2008/0024270 A1* | 1/2008 | Katagiri | B60R 25/04 340/5.72 |
| 2009/0146846 A1* | 6/2009 | Grossman | B60R 25/04 340/988 |
| 2010/0060452 A1* | 3/2010 | Schuster | G06Q 10/06 340/572.1 |
| 2011/0074562 A1* | 3/2011 | Ramirez | B60R 25/00 340/427 |
| 2011/0285521 A1* | 11/2011 | Ramirez | B60R 25/00 340/426.1 |
| 2014/0213238 A1* | 7/2014 | Giraud | G07C 5/008 455/418 |
| 2016/0225203 A1* | 8/2016 | Asmar | G07C 9/00309 |
| 2017/0352210 A1* | 12/2017 | Maiwand | G07C 9/00309 |
| 2017/0352214 A1* | 12/2017 | Maiwand | G07C 9/00896 |
| 2017/0352215 A1* | 12/2017 | Maiwand | G07C 9/00896 |
| 2018/0009416 A1* | 1/2018 | Maiwand | G07C 9/00182 |
| 2018/0215344 A1* | 8/2018 | Santora | H04N 5/2258 |
| 2019/0095662 A1* | 3/2019 | Wilding | H04W 4/80 |

\* cited by examiner

EARLY WARNING THEFT ALERT AND VEHICLE TRACKING SYSTEM

FIELD

This invention relates to the field of vehicle tracking and more particularly to a system for tracking vehicle position and movement with alarm and notification subsystems.

BACKGROUND

Vehicle theft is an issue. While cars have become more difficult to steal, smaller vehicles remain prone to theft.

What is needed is a means reducing theft in smaller vehicles, and if theft occurs, increasing the rate of vehicle recovery.

SUMMARY

The device and system discussed below are designed to track and report vehicle theft. The device and system are focused on use on smaller vehicles, specifically motorcycles, small watercraft, another related power sports hardware.

Power sports theft protection is different as compared to auto theft generally due to the size of the vehicle and the frequency of use.

A typical automobile is driven nearly every day. In contrast, power sports equipment must wait for the user to have time, and potentially favorable weather, before the vehicle can be used. Thus, power sports vehicles may spend a long time sitting between uses. This is an issue for two reasons. First, because battery conservation is important, as any theft reporting device must be battery conscious to avoid draining the vehicle's battery. Second, if theft does occur the user may not realize the absence of the vehicle for a longer period of time.

Construction equipment has similar issues of long periods of non-use, and thus is also a good fit for the device and system described.

The final problem physical. Power sports vehicles are often small enough that they can be stolen without being started. Generally, automobiles are stolen by bypassing the ignition system and driving the car away. Thus, generally the vehicle is started before it is stolen. But a motorcycle, personal watercraft, or other smaller power sports vehicle can be moved by being loaded onto a trailer, and driven away without ever being started.

The theft detection system tracks movement in combination with determining whether an authorized user is present.

The hardware installed on the vehicle cooperates with an authorized Bluetooth portable device, such as a cell phone, to determine whether the user who is moving the vehicle is authorized. If the system detects that the user who is moving the vehicle is not an authorized user, the system reports the movement and tracking begins to aid in vehicle recovery.

Determining whether or not to report movement depends on the state of the system. The system arms and disarms based on the proximity of an authorized user, the authorized user identified by a portable device transmitting a known identification.

When a portable device with an authorized ID is within a certain range of the vehicle, the vehicle is in an unarmed state. When the portable device moves too far away from the vehicle the vehicle arms and begins to monitor for motion. Motion can be detected based on data from an internal accelerometer as well as position change detection provided by one or more global navigation subsystems.

When a user first walks away from the vehicle, for example after parking, the on-board device is activated. The device communicates with a central server, commonly using a cellular telephone network, to locate the vehicle using a Global Navigation Satellite System (GNSS) to establish the position of the vehicle. This position is shared with the Secure Monitoring Center (SMC)

The device then begins to monitor for movement.

For example, if the vehicle is moved, a motion alert message is sent to the user's portable device via a cellular telephone network, by SMS text message, by email, instant message, or by any combination of the above. Additionally, the motion alert is sent to the SMC, which centrally monitors activity of all provisioned devices.

When the user returns to the vehicle, the onboard device with Bluetooth detects the presence of the portable device and disarms, thus preventing the user from being alerted for authorized motion.

Optionally, the system continues to track and report motion to the SMC even though the authorized user is present. This reporting is useful for other reasons beyond theft, such as locating a parked vehicle, or tracking vehicle usage.

Components of the on-board device include:
circuit board;
accelerometer;
processor;
cellular modem;
cellular antenna;
Bluetooth module;
Bluetooth antenna;
GNSS receiver;
GNSS antenna;
voltage regulator; and
backup battery.

The SMC generally receives data from the device, but it is also capable of requesting device status, updating firmware, and related functions via a cellular network or other data connection.

Power conservation is a critical issue in the device given the relatively small batteries fitted to powersports vehicles, in combination with long idle periods.

The device's Power Management System causes the device to go into "sleep mode" when it feels no motion for a pre-determined time, for example, entering sleep mode after 15 minutes of inactivity. The device is awoken by motion from the accelerometer. Or, if no motion is detected within 24 hours, the system wakes up, looks for info from server, and then goes back to sleep.

The process of purchase and installation is as follows:
Purchase and installation steps
User purchases the device for their vehicle.
User, Dealer, or SMC operator completes the device registration form online.
User assigns who is authorized to use the associated vehicle.
User can change, add, or delete authorizations at any time through the secure web portal.
Dealer or user installs the device on the vehicle.
This device verifies proper communication with the SMC, and verifying both cellular data and GNSS signals.
Device indication lights confirm to the installer that cellular data and GNSS connections are confirmed.
The cellular data and GNSS lights will not be used after installation.

The Bluetooth security feature will not function for 30-minutes after the install is complete and the device has checked the SMC.

The SMC alerts the installer when installation is complete and systems are functioning properly.

The SMC will notify the user when installation is complete.

The device then operates normally, as described above.

In the event the device detects unauthorized movement, a recovery process begins.

At the SMC, a team member will immediately start tracking the device is and associated vehicle.

Messages by text and/or email are sent to all persons indicated on the account.

The team member communicates with the user to confirm the movement is unauthorized, and not a false alarm.

If it is a false alarm, tracking will stop.

If in fact it is an unauthorized movement, then the team member will continue to track the vehicle.

The SMC, or user, will alert law enforcement of the theft.

The SMC will track vehicle location.

The team member will communicate with law enforcement officers via phone or Internet to share current position and movement data.

The SMC can provide aerial pictures of the vehicle location, if needed. The SMC will stop tracking when the vehicle has been recovered.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Figure 1:
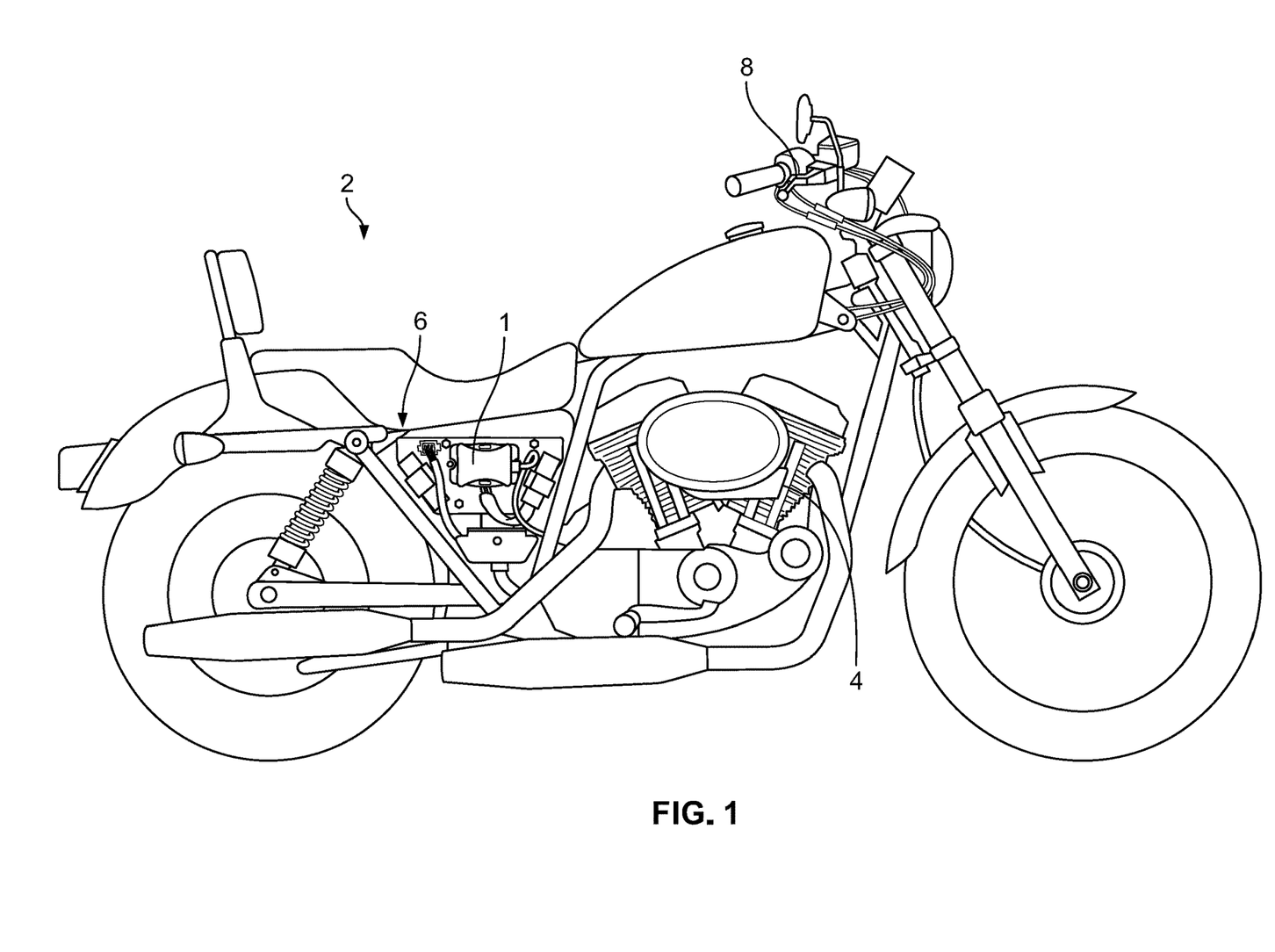
FIG. 1 illustrates a view of the vehicle tracking device installed on a vehicle.

Referring to FIG. 1, a view of the vehicle tracking device installed on a vehicle is shown.

The motion detection and notification device 1 is shown installed on a vehicle 2, here a motorcycle.

The vehicle 2 includes an engine 4 that creates mechanical energy, a portion of which charges the vehicle battery 6 (hidden beneath the seat of the vehicle 2). The vehicle battery in turn sends power to the motion detection and notification device 1.

An ignition 8 controls the on/off state of the vehicle 2, and is an optional additional input to the motion detection and notification device 1.

Figure 2:
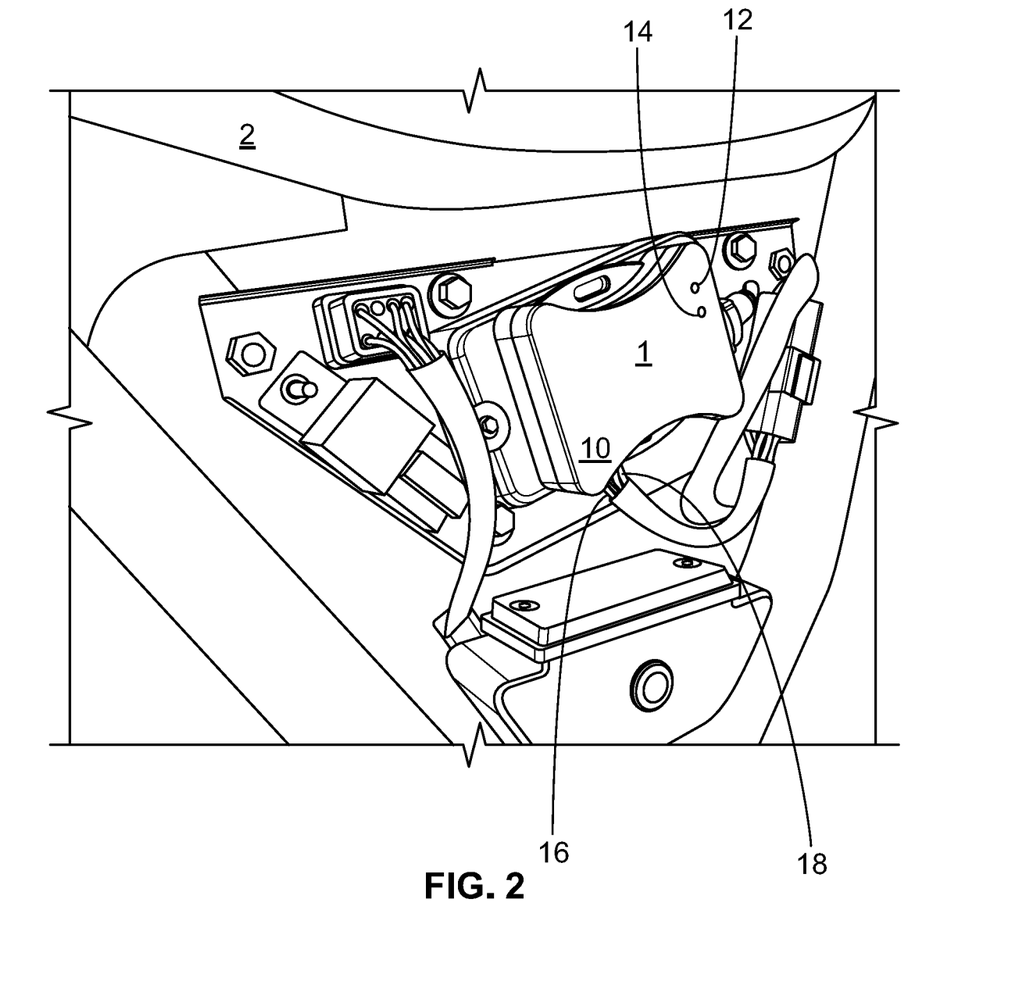
FIG. 2 illustrates a close-up view of the vehicle tracking device installed on a vehicle.

Referring to FIG. 2, a close-up view of the vehicle tracking device installed on a vehicle is shown.

The components of the motion detection and notification device 1 are largely surrounded by a protective case 10.

Visible through the case 10 are the cell signal light 12 and GNSS is ("Global Navigation Satellite System") signal light 14. These lights 12/14 are used during the installation process to indicate a successful connection to their respective data sources.

Power wire 16 and ground wire 18 connect the motion detection and notification device 1 to the vehicle battery 6 (see FIG. 1).

Figure 3:
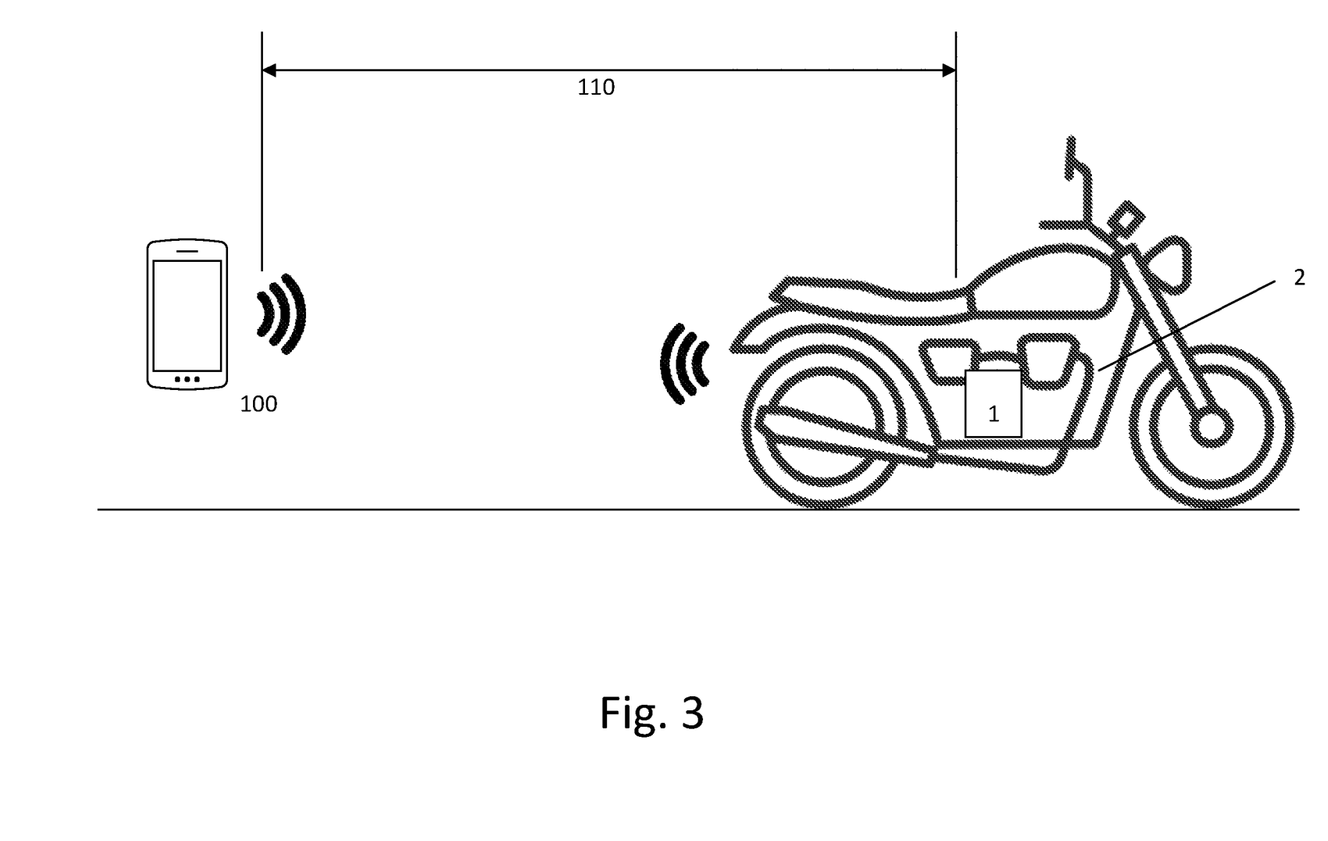
FIG. 3 illustrates a schematic view of the distance tracking feature of the vehicle tracking system.

Referring to FIG. 3, a schematic view of the distance tracking feature of the vehicle tracking system is shown.

During operation, the motion detection and notification device 1 mounted on vehicle 2 tracks the position of the portable device 100 with respect to the vehicle 2.

When the portable device 100 is too far from the vehicle 2, defined as outside the activation distance 110, the motion detection and notification device 1 switches to an armed state.

If the portable device 100 returns to a position within the activation distance 110, the motion detection and notification device 1 switches to a disarmed state.

Note that the above assumes that the portable device 100 is an authorized device. An unarmed device that moves within the activation distance 110 will not cause the motion detection and notification device 1 to switch to a disarmed state.

The distance of the portable device 100 from the vehicle 2 is determined using one of multiple methods: signal strength measurement, differential GNSS position of the motion detection and notification device 1 and portable device 100, Bluetooth proximity detection, Bluetooth real-time locating systems (RTLS), Bluetooth indoor positioning systems (IPS), or similar methodologies.

Figure 4:
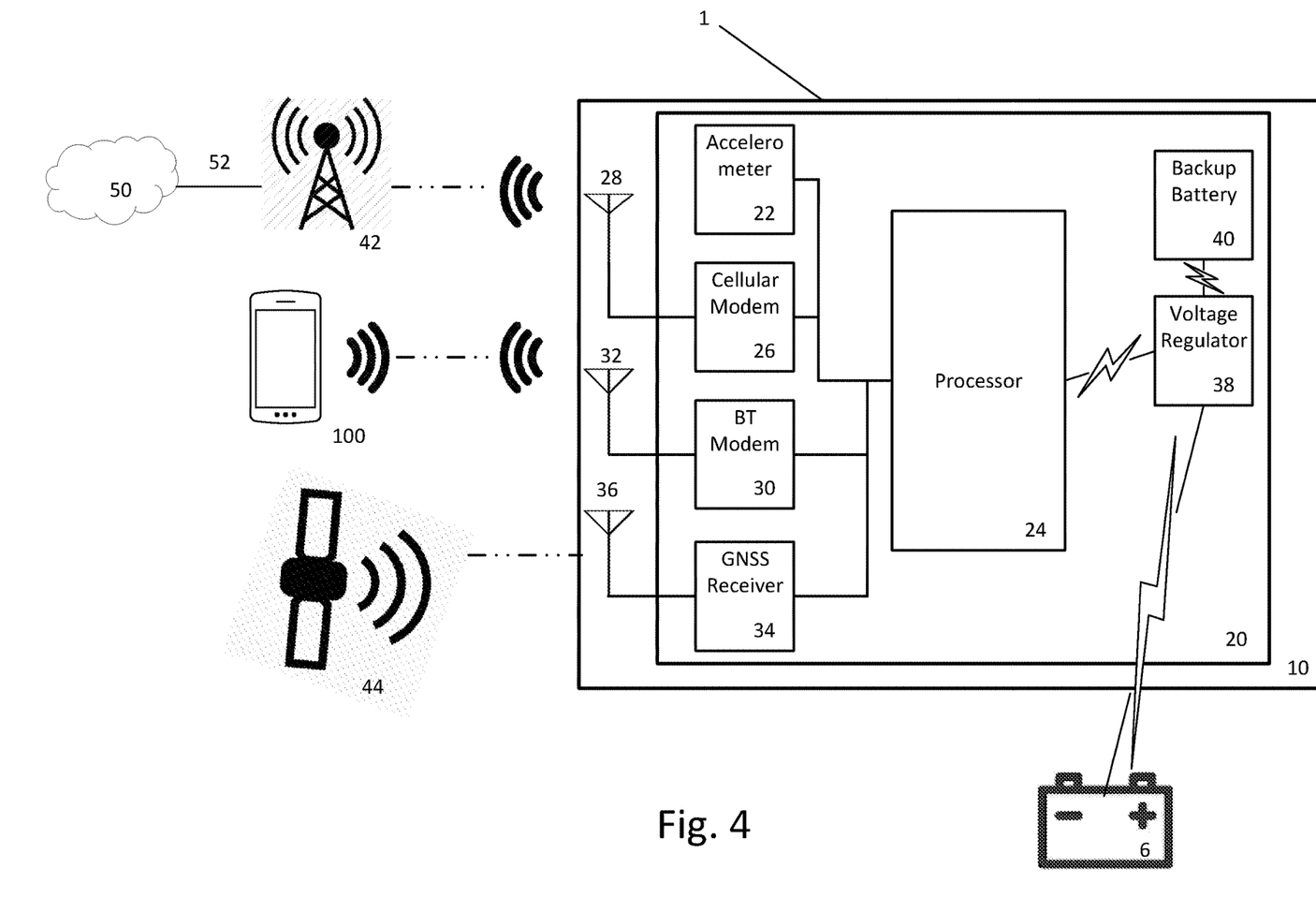
FIG. 4 illustrates an overview of the system components and their methodology of operation.

Referring to FIG. 4, an overview of the system components and their methodology of operation is shown.

The motion detection and notification device 1 includes a case 10 that surrounds one or more circuit boards 20.

Mounted on the circuit board(s) 20 is a processor 24, connected to an accelerometer 22, cellular modem 26 with cellular antenna 28, Bluetooth module 30 with Bluetooth antenna 32, and GNSS receiver 34 with GNSS antenna 36.

The antennas 28/32/36 are mounted on the circuit board 20, exist as separate components within the case 10, or protrude outside the case 10 if needed for superior signal acquisition.

The processor 24 and other components are powered via a voltage regulator 38. The voltage regulator is preferably supplied by both the vehicle battery 6 and a backup battery 40.

The cellular modem 26 communicates with a cellular tower 42 to send and receive data. Data is then transmitted over the Internet 52 to the cloud 50, ultimately being stored in the SMC database 56, accessible from the Secure Monitoring Center 54 via the Internet 52.

The Bluetooth module communicates with one or more portable devices 100.

The GNSS receiver receives signals from positioning satellites 44, such as those that are part of the GPS, GLONASS, and Galileo systems.

Figure 5:
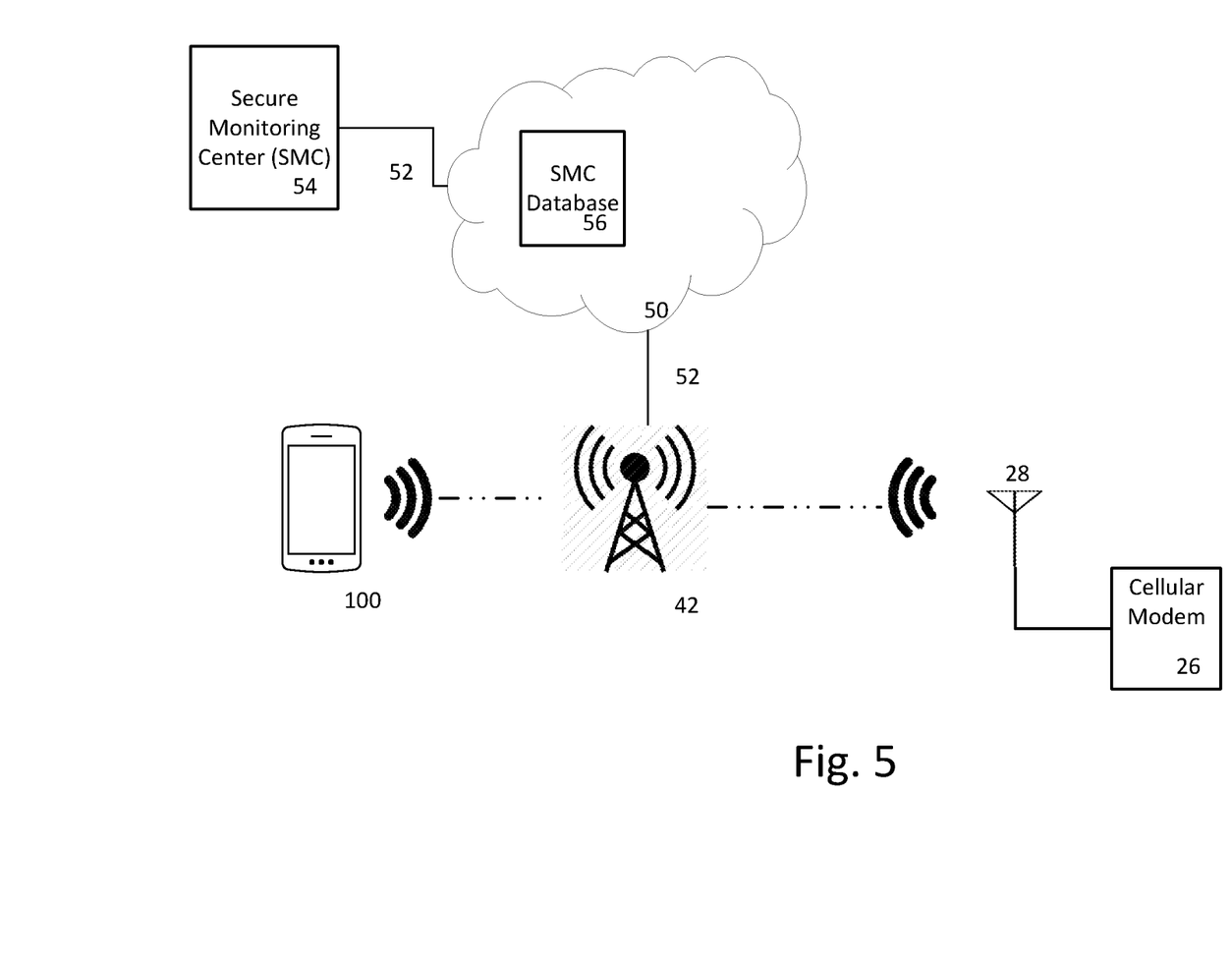
FIG. 5 illustrates an overview of how data flows within the system.

Referring to FIG. 5, an overview of how data flows within the system is shown.

The cellular modem 26 communicates with a cellular tower 42 to send is and receive data. Data is then transmitted over the Internet 52 to the cloud 50, where the data is accessible by the SMC (Secure Monitoring Center) 54.

Figure 6:
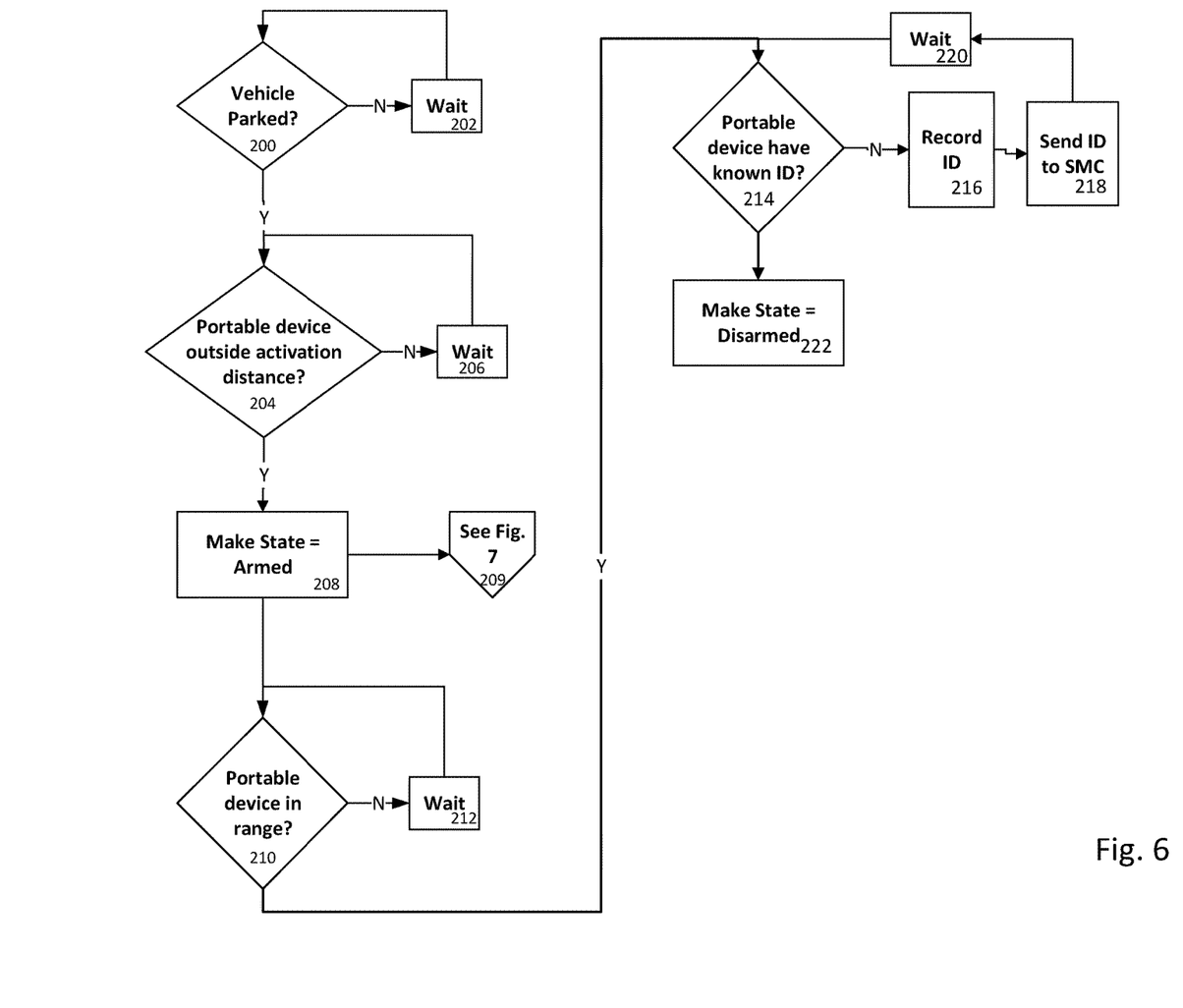
FIG. 6 illustrates a flowchart of system operation for arming.

Referring to FIG. 6, a flowchart of system operation for arming is shown.

The system first determines whether the vehicle 2 (See FIG. 1) is parked 200. This is done by monitoring the status of the ignition 8 (See FIG. 1) or waiting a pre-determined amount of time where position remains unchanged and the accelerator records no movement, or movement only associated with a user positioning the vehicle 2.

If the vehicle 2 is not parked, the system waits 202.

If the vehicle 2 is parked, the system next monitors the position of the portable device 100 (See FIG. 3). If the portable device 100 has not exceeded the activation distance 110 (See FIG. 3), then the system waits 206.

Figure 7:
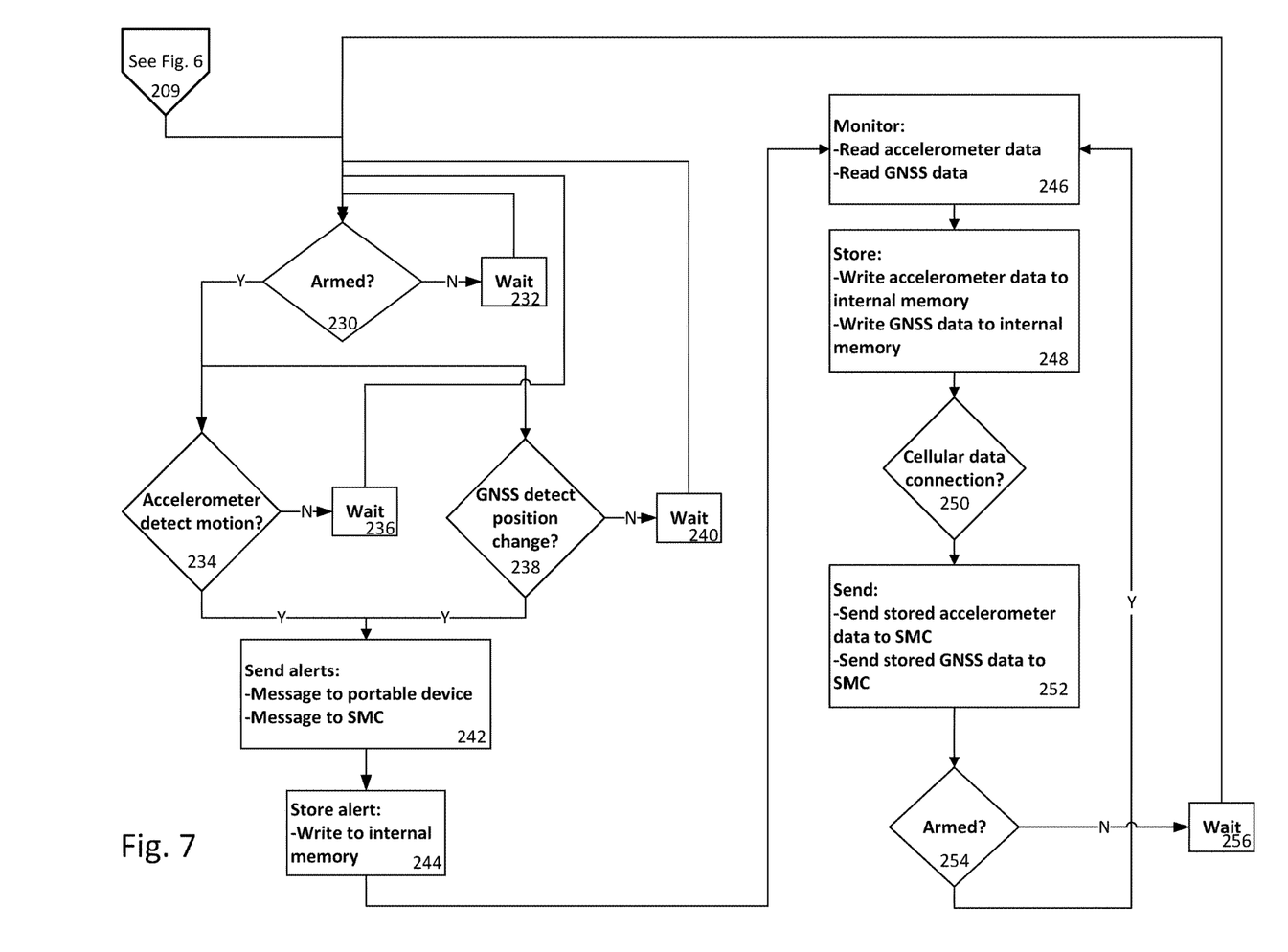
FIG. 7 illustrates a flowchart of system operation for position tracking and reporting.

If the portable device 100 has exceeded the activation distance 204, the system state is changed to Armed 208. The subroutine of monitoring for motion is shown in FIG. 7, reference 209.

With the system in an Armed state, it continues to monitor 210 for return of the portable device 100. If no portable device 100 is in range, the system waits 212, then checks again.

If a portable device 100 is in range, the system compares the identification ("ID") of the portable device 100 to its database of authorized IDs 214.

If the ID is not authorized, the system records the ID 216 in case the information becomes useful as part of recovery. The recorded ID is sent to the SMC 218 for recordation in the database. The system then waits 220.

If the ID is authorized as a known ID, the system state is changed to Disarmed 222.

Referring to FIG. 7, a flowchart of system operation for position tracking and reporting is shown.

The theft detection subroutine first checks for a system state of Armed 230. If the system is not Armed, it waits 232.

If the system state is Armed, the system watches for any data from the accelerometer reporting motion 234. If no motion is reported, the system waits 236, then checks again.

The system simultaneously watches for the GNSS receiver to report any change in position 238. If no position change is detected, the system waits 240.

When the system state is Armed, most commonly the vehicle will be in a fixed position, waiting for the user to return. Thus, the accelerometer and GNSS receiver will generally report no motion, and the system will continue to wait.

But, if the accelerometer or GNSS receiver report motion, the vehicle is potentially being moved by a malicious third-party. This triggers the system to begin motion tracking and reporting.

The system first sends an alert message to the portable device, using either Bluetooth or data via the cellular modem and Internet, and send an alert message to the SMC (Secure Monitoring Center) 242.

The system stores the alerts in internal memory 244.

The system continues to read both accelerator and GNSS data 246, and to store the data internally 248.

If a cellular connection exists 250, the accelerometer data and GNSS data are sent to the SMC 252.

The system then confirms that it is still armed 252. If yes, the monitor/store/send steps 246/248/250/252 are repeated. If not, the system waits 256, and returns to again check whether armed 230, repeating its waiting until again armed.

Figure 8:
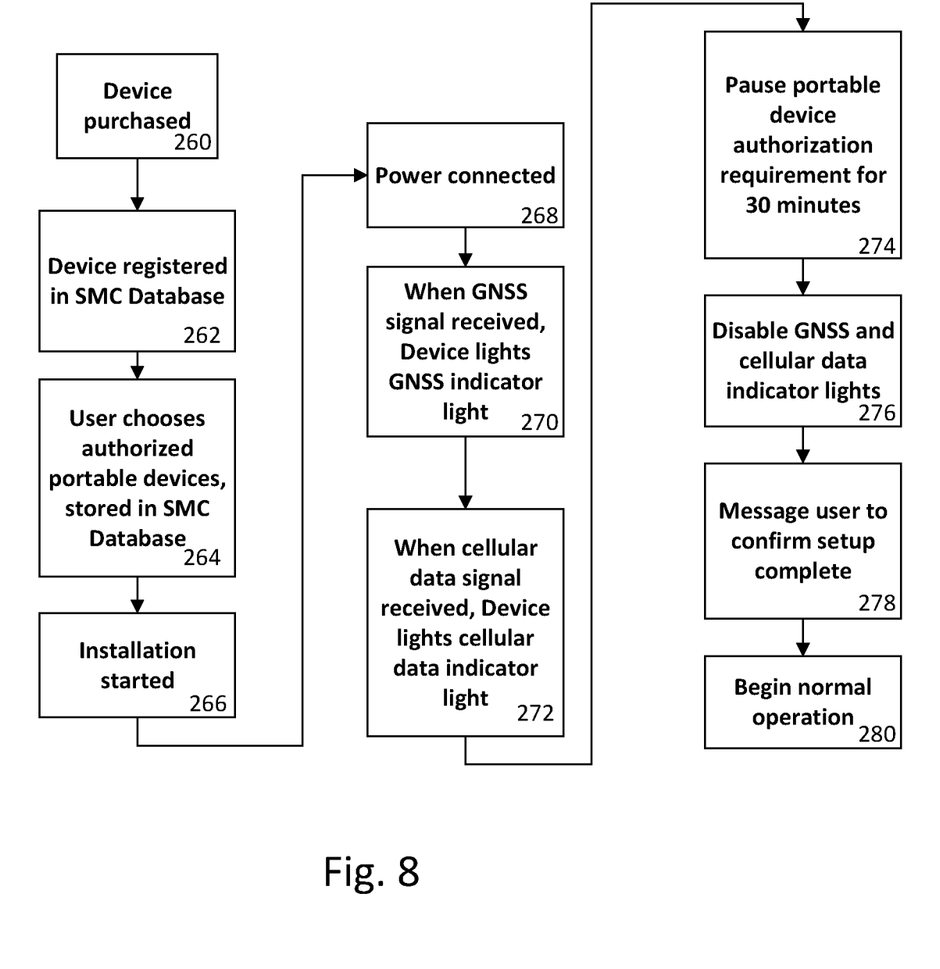
FIG. 8 illustrates a flowchart of system operation during installation.

Referring to FIG. 8, a flowchart of system operation during installation is shown.

The device is purchased 260 for installation. The device is registered in the SMC database 262, connecting the specific device to its associated vehicle.

During registration, or after registration, the user or installer authorizes one or more portable devices 264. The portable device information is saved in the SMC Database in association with the vehicle.

With the device initialized, installation is started 266.

First, power is connected 268. With power connected, the GNSS receiver searches for a signal. When received, the device lights the GNSS indicator light 270. This light indicates to the installer that position data is being received.

With power connected, the cellular model searches for a signal. When received, the device lights the cellular data indicator light 272. This light indicates to the installer that a cellular data connection is confirmed.

The device then pauses the requirement for an authorized portable device 274. This authorization is preferably paused for thirty minutes, but other amounts of time are anticipated. Pausing the requirement for an authorized portable device allows the installer to complete installation without triggering the device to be armed.

After thirty minutes, or the desired time, has elapsed since confirmed connection of the GNSS receiver and cellular modem, the indicator lights are disabled 276.

The device then sends a message to the to confirm setup is complete 278.

The system then begins normal operation 280.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method of monitoring for unauthorized movement of a vehicle, the method executed by a system installed on the vehicle after the vehicle is purchased by a user, the method comprising the steps of:
   waiting for the vehicle to be parked;
   waiting for the user to leave the vehicle with an authorized portable device, including the steps of:
      listening for a Bluetooth signal broadcast by the authorized portable device;
      if the Bluetooth signal is received, searching the Bluetooth signal for an identification code;
      if the identification code is found, comparing the identification code to that of a database of authorized identification codes;
      if the identification code has a match within the database of authorized identification codes, maintaining the system installed on the vehicle in a system state of disarmed;
      if no signal is received, changing the system state of the system installed on the vehicle to armed;

after the system state of the system installed on the vehicle is changed to armed, monitoring for the return of the user with the authorized portable device, including the steps of:
  listening for the Bluetooth signal broadcast by the authorized portable device;
  if the Bluetooth signal is received, searching the Bluetooth signal for the identification code;
  if the identification code is found, comparing the identification code to that of the database of authorized identification codes;
  if the identification code has a match within the database of authorized identification codes, changing the system state of the system installed on the vehicle to disarmed;
monitoring for unauthorized movement while the system state of the system installed on the vehicle is armed, including the steps of:
  checking for a signal from an accelerometer indicating movement of the vehicle;
  checking for a signal from a Global Navigation Satellite System (GNSS) receiver indicating a position change of the vehicle;
  as long as the system state of the system installed on the vehicle remains armed, if the accelerometer or GNSS receiver do not indicate movement or a position change, repeating the previous two steps of checking for a signal from the accelerometer or GNSS receiver;
  if the accelerometer indicates movement or the GNSS receiver indicates position change:
    sending an alert to the authorized portable device and to a central monitoring center;
    storing the alert in internal memory of the system installed on the vehicle;
    reading accelerometer data from the accelerometer, and writing accelerometer data to internal memory the system installed on the vehicle;
    reading GNSS data from the GNSS receiver, and writing GNSS data to internal memory the system installed on the vehicle;
    checking for a cellular data connection;
    if the cellular data connection exists, using a cellular modem of the system installed on the vehicle to send accelerometer data and GNSS data to the central monitoring center;
    checking system state of the system installed on the vehicle to confirm armed;
    if system state of the system installed on the vehicle is armed, repeating steps of reading accelerometer data and GNSS data, checking for cellular signal, and sending accelerometer data and GNSS data;
    if system state of the system installed on the vehicle is not armed, stopping accelerometer and GNSS monitoring.

2. The method of claim 1, further comprising the following steps before the first step of "waiting for the vehicle to be parked":
  the installer installing the system on the vehicle;
  an installer registering the system installed on the vehicle in the database of authorized identification codes maintained by the central monitoring center;
  the installer connecting vehicle power to the system installed on the vehicle;
  the system installed on the vehicle confirming the GNSS receiver is receiving position information, and lighting a GNSS indication light;
  the system installed on the vehicle confirming the cellular data connection is active, and lighting a cellular data indication light;
  the system installed on the vehicle waiting thirty minutes for the system to continue, thus allowing the installer to complete installation of the system on the vehicle;
  the system installed on the vehicle disabling the GNSS indication light;
  the system installed on the vehicle disabling the cellular data indication light;
  the system installed on the vehicle sending a message to the authorized portable device confirming setup is complete.

3. An aftermarket vehicle security system for use by a user, the system comprising:
  a device for installation on a vehicle;
    the device capable of detecting motion using an integrated accelerometer and integrated Global Navigation Satellite System (GNSS) receiver;
    the device having an armed state and a disarmed stated;
      the disarmed state triggered by presence of a portable device broadcasting a known ID, inside a predetermined activation distance;
      the armed state triggered by lack of the portable device broadcasting the known ID inside the predetermined activation distance;
    when in the armed state, the device monitoring for motion;
      the device checking the integrated accelerometer for movement and checking the GNSS receiver for position change;
      if movement or position change are detected, the device tracking and reporting movement by:
        sending an alert to the portable device and sending an alert to a Secure Monitoring Center (SMC);
        storing the alert in internal memory of the device;
        reading the integrated accelerometer for acceleration data, and storing the accelerometer data in internal memory of the device;
        reading the GNSS receiver for position data, and storing the accelerometer data in internal memory of the device;
        checking for a cellular data connection;
        if a cellular data connection exists, sending the accelerometer data and GNSS data to the SMC;
      if the device remains in an armed state, the device continues to repeat the step of "device tracking and reporting movement".

4. The method of claim 3, further comprising:
  the device able to start operation in an installation mode, and when in an installation mode:
    the user able to register the device and associate one or more known IDs with the device;
    the device configured to be installed on a vehicle;
    after the first connection of power, the device confirming the GNSS receiver is receiving position information and lighting a GNSS indication light, and confirming the cellular data connection is active and lighting a cellular data indication light;
    the device configured to pause operation for thirty minutes, thus allowing an installer to complete installation;
    the device subsequently disabling the GNSS indication light and disabling the cellular data indication light;
    the device sending a message to the user confirming setup is complete.

5. A method of alerting a user and a central monitoring authority when an associated vehicle is moved without authorization, a device installed on the vehicle in order to effectuate the method, the method comprising the steps of:
- the device listening for a portable device broadcasting a portable device identification code;
- the device comparing the identification code to an internal list of known identification codes:
  - if the portable device identification code is matched to the known identification codes, the device remains in an unarmed state;
  - if the portable device identification code does not match the known identification codes, the device is switched to an armed state;
- if the device is in an armed state, the device monitoring for movement:
  - the device monitoring an internal accelerometer for signals that indicate acceleration;
  - the device monitoring an internal Global Navigation Satellite System (GNSS) receiver for signals that indicate a change in position;
  - if acceleration is detected, or a change in position is detected, the device sending an alert to the portable device and to the central monitoring authority;
  - as long as the system state remains armed, the device continues to monitor and report movement and position by:
    - reading accelerometer data;
    - storing accelerometer data;
    - reading GNSS receiver data;
    - storing GNSS receiver data;
    - checking for a cellular data connection;
    - if the cellular data connection exists, sending accelerometer data and GNSS receiver data to the central monitoring authority.

6. The method of claim 5, further comprising the following steps before the first step of "the device listening":
- an installer registering the device in the database of authorized identification codes;
- the installer installing the device on the vehicle;
- the installer connecting vehicle power to the device;
- the device confirming the GNSS receiver is receiving position information and lighting a GNSS indication light;
- the device confirming the cellular data connection is active and lighting a cellular data indication light;
- the device waiting thirty minutes, thus allowing an installer to complete installation of the device on the vehicle;
- the device disabling the GNSS indication light;
- the device disabling the cellular data indication light;
- the device sending a message to the user confirming setup is complete.

* * * * *